United States Patent Office 3,405,492
Patented Oct. 15, 1968

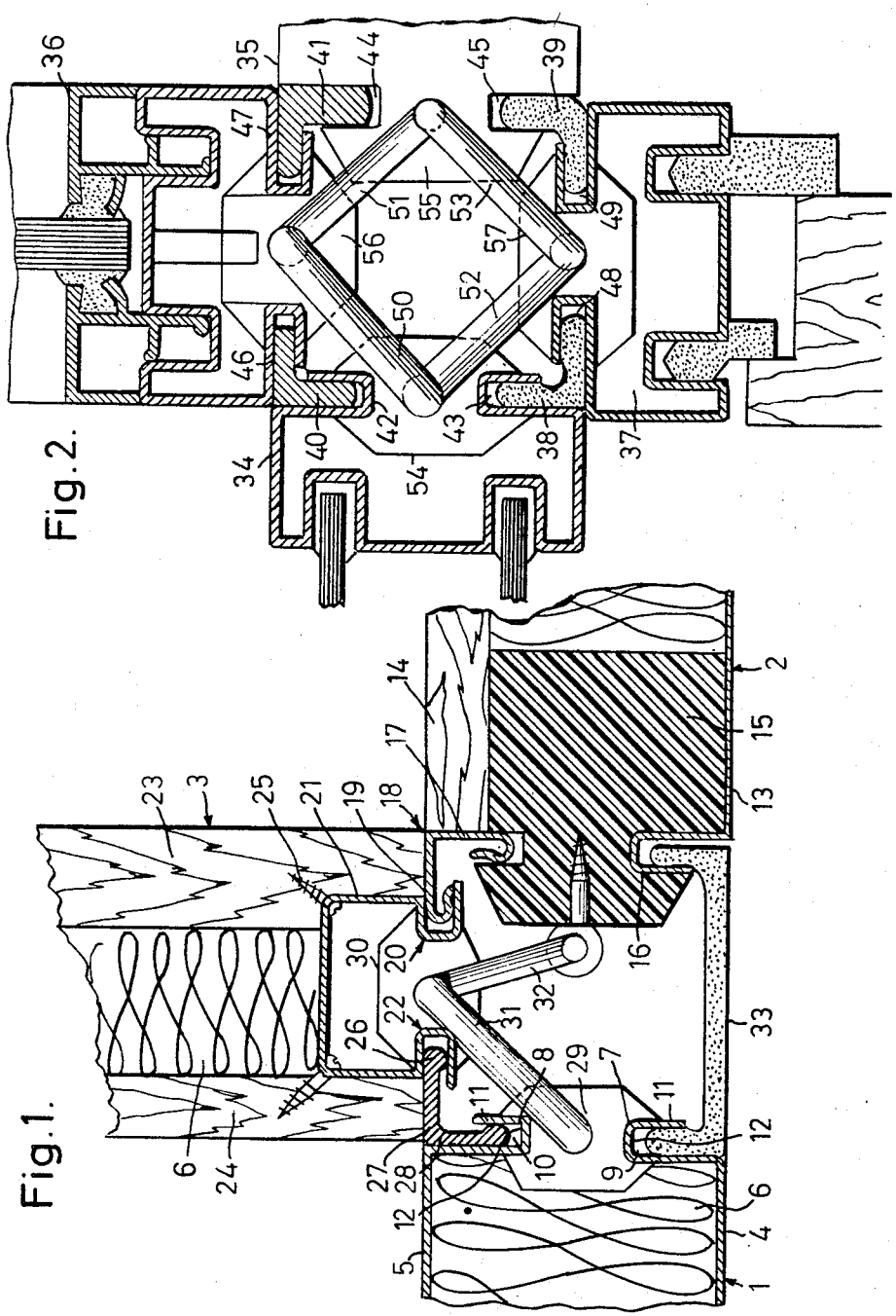

3,405,492
DISMANTLEABLE WALL ASSEMBLY
Ernst Koller, 64 Paradiesstrasse, 4102 Binningen,
Basel-Land, Switzerland
Filed Mar. 11, 1966, Ser. No. 533,562
Claims priority, application Switzerland, Apr. 30, 1965,
6,037/65
1 Claim. (Cl. 52—281)

ABSTRACT OF THE DISCLOSURE

A dismantleable wall assembly composed of a plurality of separate wall elements each having two vertical sides, top edge and bottom edge with vertical ends. Continuous grooves form pockets on each side of the wall element and each groove has a base with two flanks with each flank being nearer the end of the wall element and shorter than the distance of the base of the groove from the respective side of the wall element. Also continuous connecting members are releasably held together adjacent the wall elements and each connecting member comprises two limbs with one limb engaging in the groove of the wall element and the other engaging in the groove of another wall element.

---

The present invention relates to a dismantleable wall assembly comprising separate wall elements. The wall elements may be single-layer or double-layer, and may be sheet steel, chip board, plastics, "Eternite" or artificial stone plates or the like.

With known dismantleable walls, the elements are connected to one another by means of clamping members, straps, screw connections, ceiling edges and door frames. These walls can have various defects. More especially, they do not have a sufficient sealing action against transmission of noise at the joints and present many secondary passages for the transmission of sound waves. Furthermore, these walls generally comprise a comparatively large number of special section members, this complicating the storage, manufacture and assembly of the elements and increasing the cost of the walls.

It is an object of this invention to obviate these defects.

According to the present invention, there is provided a dismantleable wall assembly comprising separate wall elements, wherein at least one end portion of each wall element is provided on both sides with a vertical or substantially vertical, continuous groove, open towards the respective longitudinal side of the wall element of which groove the outer flank is shorter than the distance of the base of the groove from the respective longitudinal side of the wall element, adjacent wall elements being releasably held together at the ends facing one another by continuous connecting members which comprise two limbs, each limb engaging in the associated groove of a respective one of two adjacent wall elements. By this means, it is first of all ensured that each connecting member completely closes off outwardly the gap between the parts of the respective wall elements which carry the two associated adjacent grooves, this being in fact independently of any joints between the adjacent wall sections, since such joints are compenasted for by the limbs of the connecting members being automatically pushed in and out in the grooves of the elements. Loose guiding of these arms in the grooves renders possible a simple assembly and dismantling of the wall or replacement of wall sections. Since the grooves can be readily made identical and can be arranged in substantially similar manner, it is possible to manage with a minimum of different sections of the connecting members.

For a better understanding of the invention and to show how the same may be carried into effect, reference will now be made by way of example to the accompanying drawings, in which:

FIGURE 1 is a horizontal section of one embodiment of connection between adjacent wall elements in a dismantleable wall according to the invention and FIGURE 2 is a like section of another embodiment.

In the embodiment shown in FIGURE 1, a generally T-shaped connecting means serves to interconnect three adjacent wall elements, a transverse wall element 3 being connected to two aligned wall elements 1 and 2 which together form a single wall. The wall element 1 consists of two sheet metal plates 4 and 5 defining the longitudinal sides thereof, with an insulating material 6 arranged between the plates. At least those end portions of the plates 4 and 5 which are shown and which are adjacent to the element 2 have several bends in such a way that compartments 7 and 8 are formed, these compartments constituting continuous vertical grooves 9 and 10, respectively, which are open towards the respective longitudinal sides of the wall element 1, and which extends over the entire height of the wall element. The outer flank 11 of each groove is shorter than the distance of the base 12 of the groove from the adjacent longitudinal side of the wall element 1. It will be appreciated that the other end of the wall element 1 may similarly be provided with two compartments like the compartments 7 and 8. Furthermore, all or both compartments are of the same dimensions and are arranged symmetrically of the vertical mean plane of the wall. In the case where the metal plates 4 and 5 comprise compartments at both ends, the plates are made the same as one another in order to simplify manufacture and storage, thereby leading to economy.

The wall element 2 is also provided on that side which is remote from the wall element 3 with a sheet metal plate 13, which is identical with the plate 4 of the element 1. The other side of the element 2 is defined by a wood fibre board 14, which is connected by means of a core 15 to the sheet metal plate 13. The cavity of the wall element 2 is again filled with insulating material 6. A compartment 16 of the sheet metal plate 13 is inset in a vertical groove of the core 15, which comprises symmetrically on the opposite side a similar groove. The latter groove is engaged by one limb 17 of a bar 18 which is of angular cross-section and of which the other limb 19 engages in a groove which is formed by a compartment 20 associated with the wall element 3. The compartment 20 is formed by several bends in one edge portion of a sheet metal strip 21 which is of generally U-shaped cross-section, the other edge portion of said strip being shaped in similar manner to provide a compartment 22. The compartments 20 and 22 are arranged symmetrically in relation to the vertical mean plane of the wall element 3. The element 3 consists of two wood fibre boards 23 and 24, between which is arranged insulating material 6. The sheet metal strip 21 is fixed by screws 25 to the boards 23 and 24. One limb 26 of an angle-section bar 27 fits into the compartment 22, while the other limb 28 fits into the compartment 8 of the element 1.

The compartments 7 and 8 which are opposite one another are held together by a holding member 29, which accommodates the compartments by partly surrounding the flanks of each groove. The compartments 20 and 22 are similarly accommodated by a holding member 30. The two holding members 29 and 30 are interconnected by bent coupling members 31. In a similar manner the holding member 30 is connected by a coupling member 32 to the core 15 of the element 2. The compartment 9 of the wall element 1 is connected with the compartment 16 of the element 2 by means of a vertical covering strip 33 which is of shallow U-section and the flanges of which fit into the compartments 9 and 16.

In order to dismantle the wall assembly described above, the cover strip 33 is extracted from the compartments 9 and 16. The coupling members 31 and 32 are then removed. The two coupling members 31 and 32 are rigidly interconnected. As a consequence, it is possible as desired to withdraw the wall element 1 longitudinally towards the left and/or the wall element 2 longitudinally towards the right, the bar 27 and/or that bar 18 being approximately extracted from the respective compartment 22 and/or the compartment 20. Alternately, either or both of the wall elements 1 and 2 can be directly withdrawn in the transverse direction from the bars 27 and 18, respectively, i.e. downwardly as seen in FIGURE 1.

If the wall element 3 is to be removed, it is sufficient to withdraw this in its longitudinal direction, after suitable release, by removing the coupling members 31 and 32, carrying with it the bars 27 and 18 and the holding member 30. Conversely, assembly of the walls can be effected with the same simplicity as with the dismantling, merely by reversing the procedure.

The interconnecting members 18, 27 and 33, being made U-shapde or L-shaped in cross-section, prevent a direct sound transmission. They deflect the sound in a labyrinth packing around the flanges or limbs into the compartments 7, 8, 16, 20 and 22, whereby a strong sound-damping effect is obtained.

The core 15 can with advantage be of such a profile that it can be used for fitting glass, or alternatively solid slab walls.

The embodiment shown in FIGURE 2 differs from that shown in FIGURE 1 in principle, only by there being four wall elements 34, 35, 36, and 37 in a cross formation. Four interconnecting members 38, 39, 40 and 41 are provided each consisting of a bar which is angular in cross-section.

Those end portions of the four wall elements which are shown facing one another are again provided on both sides with vertical outwardly open grooves 42 and 43; 44 and 45; 46 and 47; and 48 and 49, of which the outer flank is shorter than the distance of the base of the groove from the adjacent longitudinal side of the wall element in question. Since all the adjacent elements extend at right-angles to one another, each pair of adjacent grooves associated with two elements are held together by one of the four members, 38 39, 40 and 41, of angular section. The limbs of the members fit into the grooves of the wall elements.

Instead of the two coupling members 31 and 32 which are provided in the embodiment according to FIGURE 1, four rigidly interconnected coupling members 50, 51, 52, and 53 are provided in accordance with the cross formation, said members retaining holding members 54, 55, 56 and 57 in pairs with the desired mutual spacing.

FIGURE 1 shows wall elements of three different types used in conjunction, and FIGURE 2 similarly shows four further types. It will be appreciated, however, that any combination of similar or different wall elements may be employed as desired.

I claim:

1. A dismantleable wall assembly comprising a plurality of separate wall elements, each wall element having two substantially vertical sides and having a longitudinal top edge, a longitudinal bottom edge and two substantially vertical ends, a substantially vertical continuous groove forming a pocket and being formed on each side of each wall element near one substantially vertical end thereof, the groove having a base and two flanks, the flank which is nearer the end of the wall element being shorter than the distance of the base of the groove from the respective side of the wall element, the assembly further comprising continuous connecting members releasably holding together adjacent wall elements at adjacent substantially vertical ends thereof, each connecting member comprising two limbs, one limb engaging in the groove of the wall element, the other limb engaging in the groove of another wall element, two adjacent wall elements being disposed perpendicularly to each other, and a substantially vertical angle-section bar interconnecting the groove on one side of one wall element with the adjacent groove of the other wall element, the angle-section bar having two limbs fitting in the grooves.

References Cited

UNITED STATES PATENTS

| | | | |
|---|---|---|---|
| 1,619,737 | 3/1927 | Krummel | 52—281 |
| 1,912,533 | 6/1933 | Madick | 52—287 |
| 2,119,586 | 6/1938 | Kotrbaty | 52—285 |
| 2,540,622 | 2/1951 | Langenberg | 52—281 X |
| 3,300,919 | 1/1967 | Hiller | 52—287 X |

FRANK L. ABBOTT, *Primary Examiner.*

PRICE C. FAW, *Assistant Examiner.*